United States Patent

Hanley et al.

[11] Patent Number: 5,986,369
[45] Date of Patent: Nov. 16, 1999

[54] ACTUATOR HAVING PIEZOELECTRIC BRAKING ELEMENT

[75] Inventors: Mark G. Hanley, Grayslake; Guy P. Caliendo, Algonquin; Dean B. Anderson, Wonder Lake, all of Ill.

[73] Assignee: Siemens Building Technologies, Inc., Deerfield, Ill.

[21] Appl. No.: 08/914,519

[22] Filed: Aug. 19, 1997

[51] Int. Cl.$^6$ ................................................... H02K 7/102
[52] U.S. Cl. .......................... 310/77; 192/223; 454/369; 251/69; 185/40 B; 188/82.7; 188/158
[58] Field of Search ................................ 185/40 R, 40 B; 454/369; 251/69, 129.03, 129.11; 188/82.7, 74, 156, 158; 192/223; 310/317, 77, 93; 318/372

[56] References Cited

U.S. PATENT DOCUMENTS

| | | |
|---|---|---|
| 3,192,416 | 6/1965 | Gerber . |
| 3,297,889 | 1/1967 | Breskend . |
| 3,302,043 | 1/1967 | Berger . |
| 3,808,895 | 5/1974 | Fitzwater .............................. 251/69 X |
| 4,581,987 | 4/1986 | Ulicny ................................ 185/40 R X |
| 4,602,702 | 7/1986 | Ohta et al. . |
| 4,623,044 | 11/1986 | Ohta et al. . |
| 4,689,516 | 8/1987 | Yokoyama et al. . |
| 4,741,508 | 5/1988 | Fukamachi ............................ 251/69 X |
| 4,854,424 | 8/1989 | Yamatoh et al. . |
| 4,890,027 | 12/1989 | Bohner et al. ......................... 310/77 X |
| 5,090,518 | 2/1992 | Schenk et al. . |
| 5,498,143 | 3/1996 | Drieman et al. ...................... 74/572 X |

*Primary Examiner*—Charles A. Marmor
*Assistant Examiner*—Ankur Parekh
*Attorney, Agent, or Firm*—Greer, Burns & Crain, Ltd.

[57] ABSTRACT

An electromechanical actuator maintains an external device to which the actuator is connected at an operating position when power is applied to the actuator, and allows the external device to return to a default position when the power is removed. Included in the actuator is a housing and an output coupling rotatably mounted thereon. The output coupling is configured to be connected to the external device and displaces the external device between the operating position and the default position. A driving device is mounted in the housing for providing a torque to the output coupling to displace the external device between the default position and the operating position when the driving device is energized. Also provided is a torque transmitting device for transmitting and changing the torque from the driving device to the output coupling. The torque transmitting device is cooperatively engaged to and is located between the driving device and the output coupling. Operatively connected to the torque transmitting device, a retracting device is configured for exerting a retracting force to return the external device to the default position via the transmitting device when the power to the actuator is removed. An important feature of the invention is a piezoelectric braking device for exerting a braking force on the driving device for maintaining the output coupling at the operating position against the retracting force exerted by the retracting device when the braking device is activated, and for releasing the braking force when the braking device is deactivated.

15 Claims, 3 Drawing Sheets

ACTUATOR HAVING PIEZOELECTRIC BRAKING ELEMENT

The present invention relates generally to an electromechanical actuator which has a retracting function that resets the actuator to a predetermined default position in the event of a power failure, and more particularly relates to an actuator having an electrostrictive braking element which prevents the actuator from being retracted to the default position during a normal operation when power is applied to the braking element, and allows the actuator to be reset when the power is interrupted.

A conventional actuator having the retracting function is used primarily in heating, ventilating and air-conditioning (HVAC) installations for actuating a damper or valve which is used to control air flow during emergency situations such as fire. With the use of the retracting function, the actuator positions the damper to a predetermined default position if the power to the actuator is terminated, whether intentionally shut off by an operator or through a power failure. In this manner, the actuator automatically displaces the damper without electric power to a safeguard position to assist in routing or containing the fire and smoke to areas that are designated by a preestablished fire prevention plan.

The retracting function of many conventional actuators is typically performed by a mechanism such as a spring which is included in the actuator. To counteract the retracting force of the spring so that the damper is maintained at the normal operating position, power is continually applied to the same motor in the actuator for initially displacing the damper away from the default position. As such, the motor consumes power while the damper is being displaced away from the default position, and continues to draw power in a stalled condition when the damper reaches a mechanical end stop that defines the normal operating position. This arrangement is disadvantageous in that the motor consumes relatively large amount of power, which becomes more significant when multitude of actuators of the same type are used in some large scale HVAC systems. The total power consumption of these actuators over their lifetime can be very high and costly.

Alternatively, it is known to use a solenoid as a way of maintaining the damper at its position during normal operation. When energized, a locking mechanism connected to the solenoid engages the motor and prevents it from being rotated, thus locking the damper into its normal operating position. While this approach does not require continually supplying power the motor, it does require continually providing a similar amount of power to the solenoid. Thus, no savings in power consumption is realized.

This arrangement has additional drawbacks in that the solenoid tends to seize or stick in the engaged position as a result of the solenoid being in a prolonged energized state which magnetizes the core or unequal expansion of dissimilar materials in the solenoid due to elevated temperature. Consequently, when there is a power failure due to a fire, for example, the damper may not be restored to the predetermined desired position for controlling or containing the fire.

Accordingly, it is a primary object of the present invention to provide an improved actuator having a braking device which consumes virtually no power in maintaining the damper in its position during normal operation, which braking device is simple in its design, and relatively inexpensive to produce.

Another object is to provide such an improved actuator which can be restored to its desired predetermined position in the event of a power failure.

Yet another object of the present invention is to provide such an improved actuator having a braking device which is not prone to seizures and is highly reliable.

Other objects and advantages will become apparent upon reading the following detailed description, while referring to the attached drawings, in which.

DETAILED DESCRIPTION

Figure 1:
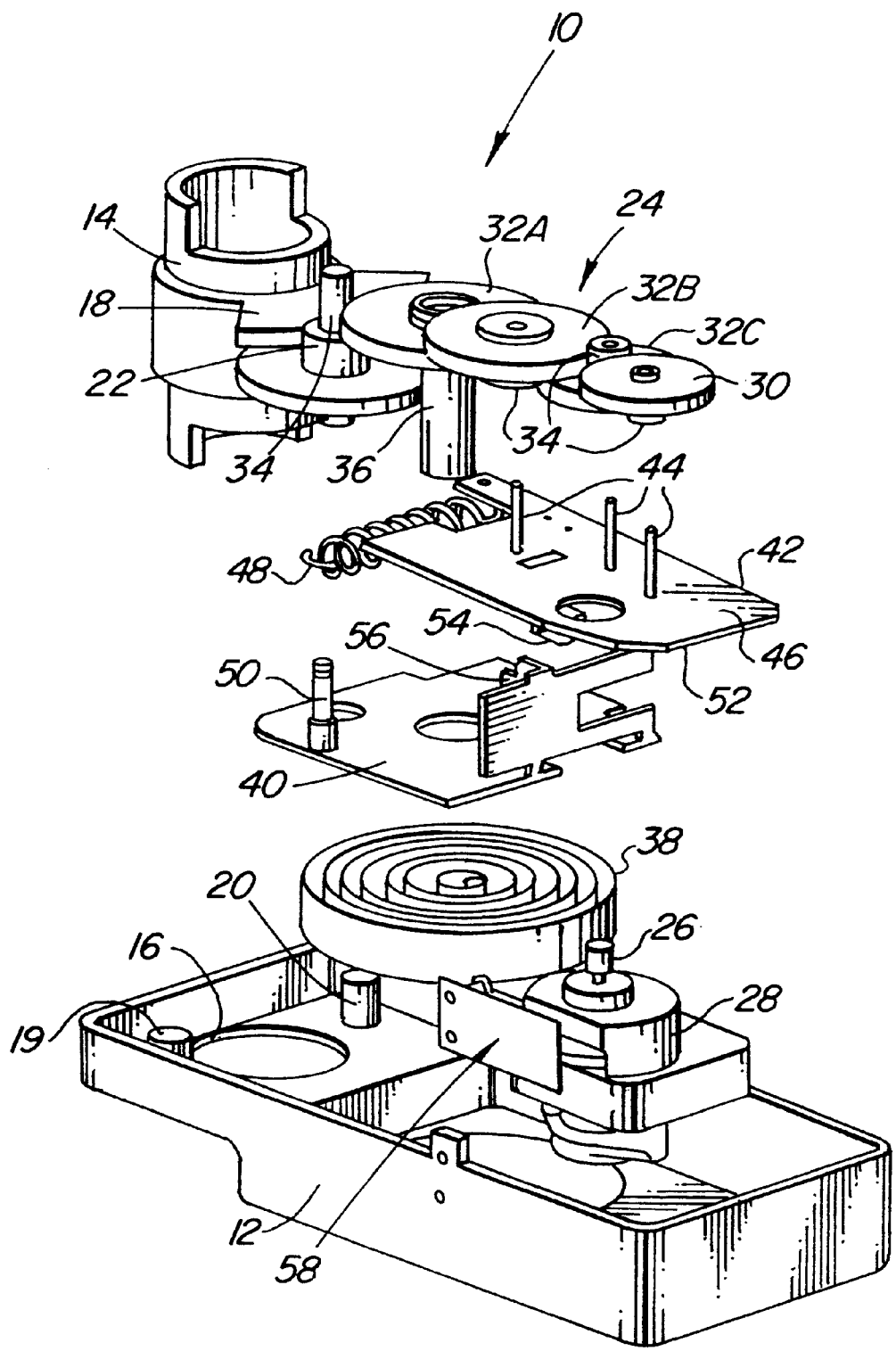
FIG. 1 is an exploded perspective view of one embodiment of the present invention illustrating an actuator with a brake device.

The present invention is directed to actuators of the type having a nonelectrical retracting function which resets the actuator to a default position when the power to the actuator is disrupted. While the present invention is suited for many differing uses where dampers and valves are operated by electromechanical actuators, the present invention is particularly adapted for opening and closing dampers in the air ducts of a HVAC system in the event of a fire and/or smoke build-up to control the flow through the building in a desired manner that conforms with safety procedures. The damper and the actuator used in this application are arranged so that when the power to the actuator is disrupted, the actuator automatically displaces the damper to a predetermined default position without the use of electric power.

Broadly stated, the present invention is directed to an improved actuator having an electromechanical actuator for maintaining an external device to which the actuator is connected at an operating position when power is applied to the actuator, and allowing the external device to return to a default position when the power is interrupted. Included in the actuator is a housing and an output coupling rotatably mounted thereon. The output coupling is configured to be connected to the external device and displaces the external device between the operating position and the default position. A driving device is mounted in the housing for providing a torque to the output coupling to displace the external device between the default position and the operating position when the driving device is energized. A torque transmitting device for transmitting and changing the torque from the driving device to the output coupling is also provided. The torque transmitting device is cooperatively engaged to and is located between the driving device and the output coupling. Operatively connected to the torque transmitting device, a retracting device is configured for exerting a retracting force to return the external device to the default position via the transmitting device when the power is removed from the actuator. An important feature of the invention is a piezoelectric braking device which exerts a braking force on the driving device. The braking force exceeds the retracting force exerted by the retracting device when the braking device is activated, but is extinguished when the braking device is deactivated.

A novel feature of the present invention is that the power required to prevent the damper from being placed in the default position during normal operation when there is no fire or smoke build-up is channeled from a motor or a solenoid to the piezoelectric braking device. The piezoelectric braking device operates on a significantly lower power, and thereby effectively reduces the amount of power necessary to maintain the external device at the normal operating position. In addition, the piezoelectric braking device is also more reliable than the conventional solenoids because there are no moving parts which can to stick to each other.

Turning now to the drawings, and particularly FIG. 1, a damper actuator, indicated generally at 10, is shown in exploded perspective view. The actuator 10 includes a housing 12 which is configured to receive a rotatable output coupler 14 through a coupling hole 16. The coupler 14 operatively couples with a damper (not shown), and it is adapted to displace the damper between a default position and a desired operating position as the coupler is rotated. Attached to the coupler 14 is an output segment 18 which rotates the coupler through its range of rotation, the boundaries of which are defined by a pair of stops 19, 20. While not shown, the outer arcuate surface of the segment 18 has teeth which engage teeth of a gear wheel 22.

Figure 2:
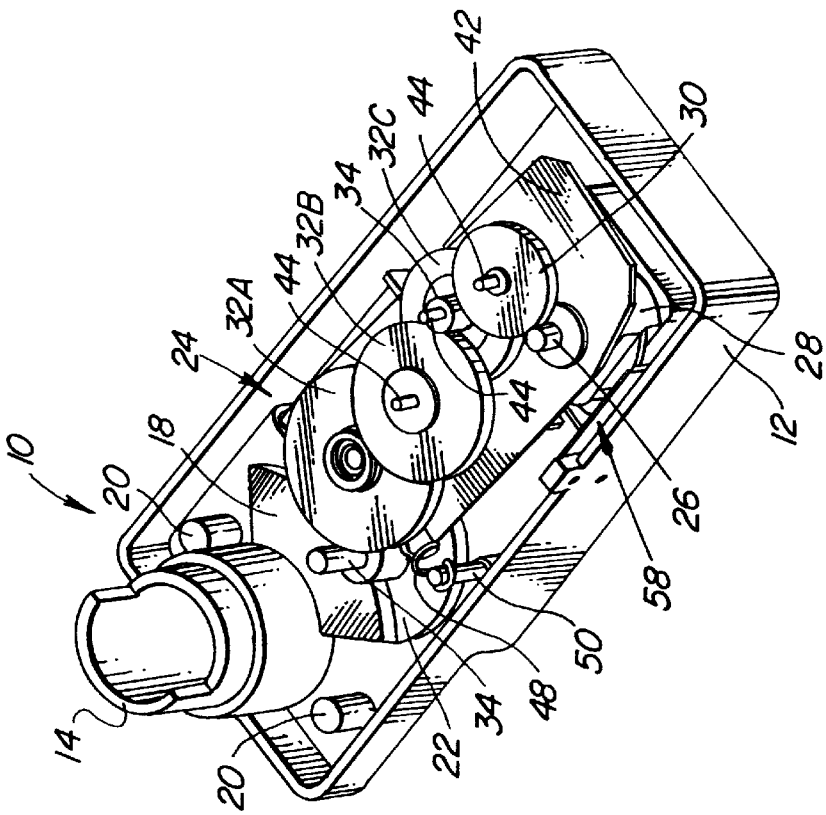
FIG. 2 is an assembled perspective view of the embodiment of the present invention shown in FIG. 1.
Figure 3:
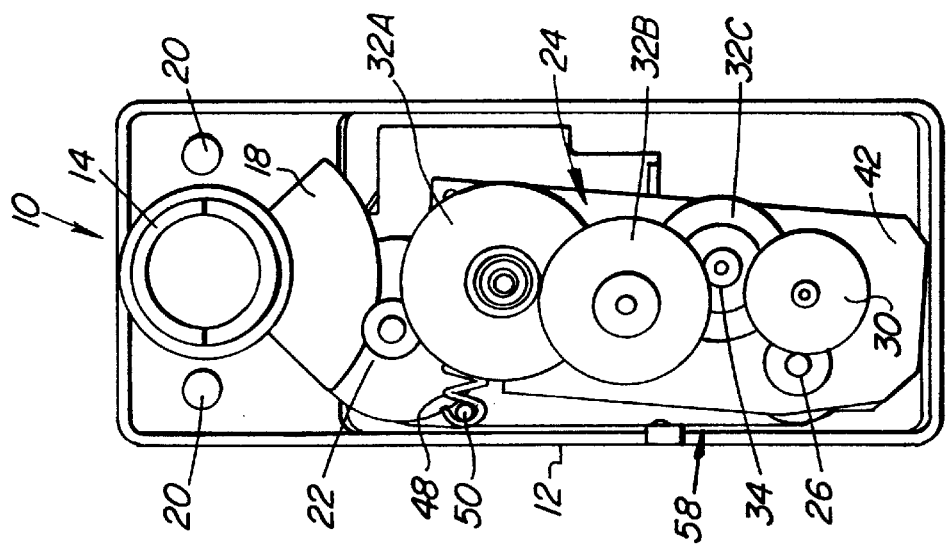
FIG. 3 is a top view of the embodiment of the present invention shown in FIG. 2.

A gear train, indicated generally at 24, includes the gear wheel 22 that is engaged with the output segment 18 and a gear wheel 30 which is operatively engaged with a drive pinion 26 of a drive motor 28 (best seen in FIGS. 2 and 3). Additional gears wheels 32A, 32B and 32C are operatively engaged and are located between the gears 22 and 30 and complete the gear train 24. Each of the gear wheels in the gear train 24 has a transfer pinion 34 attached thereto (not all pinions shown).

The gear train 24 is arranged with the axes of the gear wheels 22, 32A, 32B, 32C and 30 generally forming a zig-zag line from the motor 28 to the coupler 14 (best seen in FIG. 3). In this manner, when the motor 28 is energized and rotates the gear wheel 30, the torque produced by the motor is transferred via the gears wheels 32C, 32B, 32A and 22 to the output segment 18. It should be noted that while the preferred gear train 24 is arranged using interconnection of five gear wheels and their respective transfer pinions 34, a person of ordinary skill in the art will recognize that gear train 24 may include more or less than five gear wheels, and be arranged in various other configurations which would allow a transfer or change of torque from the motor 28 to the output segment 18.

An elongated shaft 36 which is concentric with the axis of the gear wheel 32A protrudes therefrom, and is connected to an end (connection not shown) of a retracting spring 38. The other end of the retracting spring 38 is connected to the housing 12 (connection not shown). When the damper is displaced away from the default position by the output coupler 14, the retracting spring 38 is placed under a state of torsion, and applies a force on the output coupler 14 to return the damper to its default position. In the preferred embodiment, the retracting spring 38 is a clock spring, but it is contemplated that other springs may be used.

Disposed within the housing 12, the retracting spring 38 is held in its position by a retainer plate 40 which is configured to allow the shaft 36 to be connected to the spring 38. Located directly above the retainer plate 40 is a torque pivot plate 42 which is configured to pivot around the axis of the drive motor 28. In the preferred embodiment, the pivot plate 42 includes three axles 44 fixed on the top 46 of the pivot plate 42 and arranged correspondingly with the axes of three of the gear wheels 30, 32B and 32C to allow the gear wheels to be rotated thereon (best seen in FIG. 2). A spring 48 has one end hooked to the pivot plate 42 and at the other end to a post 50 fixedly mounted on the retainer plate 40. On the bottom 52 of the pivot plate 42 is a microswitch 54 which switches as it comes into and loses contact with a stationary vertical contact arm 56 protruding from the retainer plate 40.

In operation, as the damper reaches its normal operating position, the output segment 18 comes in contact with one of the stops 19, 20 defining the boundary of the output segment. At this point, while the output segment 18 is prevented from rotating farther, the motor 28 continues to rotate in a planetary gear like motion, thereby causing the pivot plate 42 to pivot around the drive pinion 26 of the motor against the force of the spring 48 and away from the contact arm 56. As a result, the microswitch 54 loses contact with the contact arm 56, which causes the microswitch 54 to switch, and thereby deenergizing the drive motor 26 and simultaneously activating a brake device 58.

Figure 4:
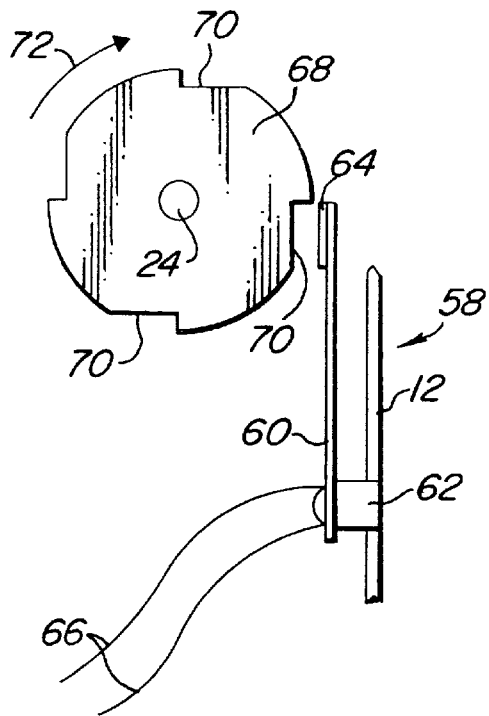
FIG. 4 is a top view of one embodiment of a brake device of the present invention with parts removed for clarity.

Turning now to FIG. 4, the brake device 58 includes a piezoelectric beam 60, which in the preferred embodiment is of a multi-layer piezo ceramic beam structure. One end of the beam 60 is fixedly mounted to a cantilever mount 62 on a side of the housing 12, while the other end has a brake pad 64 attached thereto. A pair of electrical leads 66 are also connected to the beam 60 at the mount 62. The brake pad 64 is adjacent a flywheel 68 which includes notches 70 formed on the edge thereof. The notches 70 are configured and dimensioned so that the brake pad 64 is allowed to matingly lock onto the notches without slipping out when the flywheel 68 is rotated in the direction indicated by an arrow 72, and so that the brake pad is prevented from being caught in the notches in the event the drive motor 28 were to re-engage following a transient power interruption and rotate in the opposing direction of the arrow 72. The drive motor 28 is coupled to the flywheel 68 (best seen in FIG. 1) and drives the flywheel. The motor 28 itself is mounted in the housing 12, and in the preferred embodiment is a shaded-pole ac motor, although other suitable motors are contemplated, such as dc brushed motors, ac synchronous motors or brushless dc motors.

When voltage is applied to the beam 60 via the leads 66 as a result of the switching of the microswitch 54 as described above, the beam 60 bends towards the flywheel 68 and the brake pad 64 locks onto the notches 70. As a result, the rotation of the flywheel 68 in the direction indicated by the arrow 72 is halted. The tendency of the flywheel 68 to rotate in this direction, which is the direction for displacing the damper toward the default position, is caused by the mechanical force of the retracting spring 38 via the gear train 24 and the deenergized drive motor 26.

Once the beam 60 is locked onto the flywheel 68, the actuator 10 remains in this suspended state until the voltage applied to the beam 60 is interrupted as a result of a fire or smoke build-up signal being generated. This causes the beam 60 to release its lock on the flywheel 68 and return to its form prior to the application of voltage, away from the flywheel, at which time the retracting spring 38 forces the output coupler 14 to bring the damper into the default position.

Figure 5:
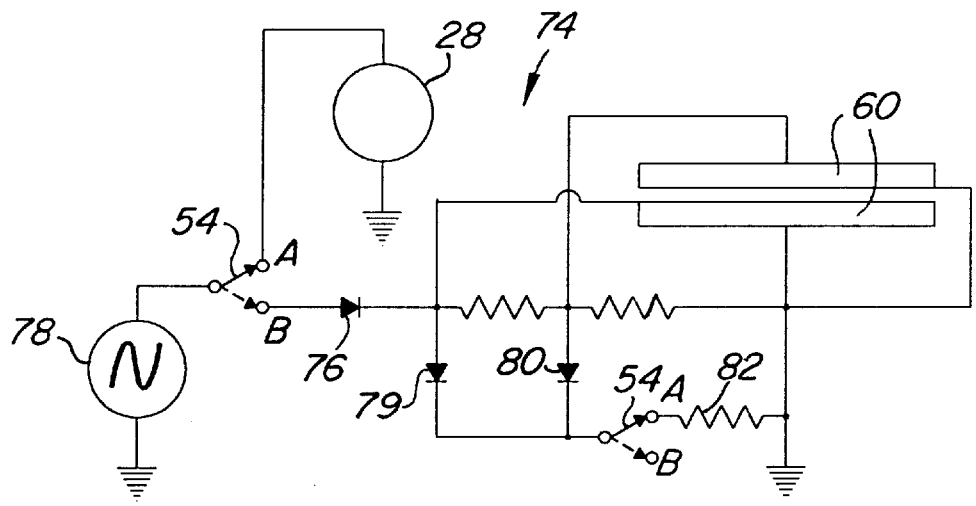
FIG. 5 is a schematic diagram of one embodiment of a circuitry for controlling the brake device.

Turning now to FIG. 5, a schematic diagram is shown of one embodiment of a circuit, indicated generally at 74, for controlling the piezoelectric beam 60. A rectifier diode 76 is connected downstream of the switch 54 for converting the ac voltage from an input source 78 to the dc voltage which is supplied to the piezoelectric beam 60. A pair of discharge diodes 79, 80 are also included and are connected to the beam 60 for discharging the beam 60 when the dc voltage output from the diode 76 is removed therefrom.

The switch 54 is a double-pole, double-throw switch and connects the ac input source 78 to the motor 28 and the discharge diodes 79, 80 to ground via a resistor 82, as depicted in FIG. 5 in position A, to place the damper in the normal operating position. When the switch 54 is in this position, the supply of input dc voltage to the piezo beam 60 is interrupted and the charge on the beam, if any, is discharged through the diodes 79, 80 to ground. Once the damper reaches the operating position, the switch 54 connects the input voltage source 78 to the rectifier diode 76 and disconnects the discharge diodes 79, 80 from ground, as depicted in FIG. 5 in position B. When the circuit 74 is placed in this configuration, the beam 60 activates and bends towards the flywheel 68 to lock onto the notches 70 (best seen in FIG. 4). The beam 60 cannot discharge through the diodes 79, 80 because they are effectively eliminated from the circuit 74 when the switch 54 is in position B.

Figure 6:
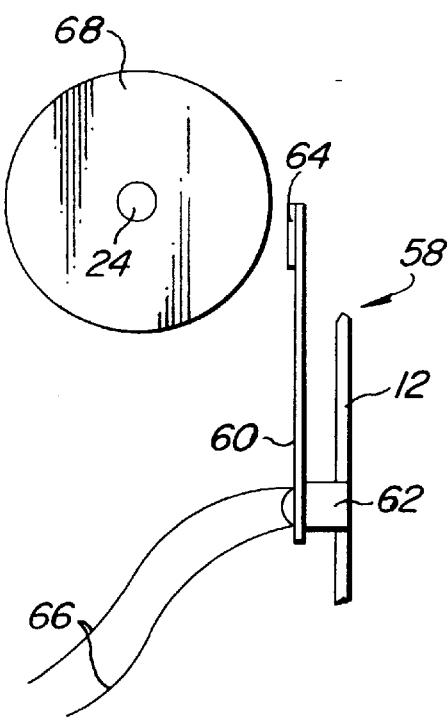
FIG. 6 is a top view of another embodiment of the brake device of the present invention also with parts removed for clarity.

Turning now to FIG. 6, another embodiment of the present invention is shown in which the flywheel 68 does not have the notches 70 (the same numbers used in FIG. 4 will also be used to describe the features shown in FIG. 5). Similar to the embodiment shown in FIG. 4, the piezoelectric brake device 58 of FIG. 5 bends towards and away from the flywheel 68 depending on the application of voltage on the beam 60. To prevent the damper from returning to the default position when it is not required, the brake device 58 of this embodiment applies a substantial frictional load on the flywheel 68 as the brake pad 64 makes contact with the flywheel. One of ordinary skill in the art will recognize that additional methods may be used to stop the rotation of the flywheel 68, for example, bumps or other protrusions affixed to the perimeter of the flywheel.

Regardless of the type of the brake device 58 employed, it is important to note that by utilizing the above-described novel piezoelectric brake device 58 instead of the drive motor 28 or a solenoid (not shown) to stop the rotation of the flywheel 68, and thus maintain the damper in the desired position, a substantial savings in power is realized. For example, it would require about 5 to 10 W for the drive motor 28 or the solenoid to suspend the damper away from the default position. In contrast, only about 0.640 mW is needed by the brake device 58 to keep the damper in its normal operating position, which is considerably less, especially in view of the fact that hundreds of actuators may be employed in a single HVAC system.

From the foregoing description, it should be appreciated that an actuator for controlling air dampers in air ducts has been shown and described which has many advantageous operational characteristics and is reliable in its operation. The use of a piezoelectric beam to counteract the force of the retracting spring significantly conserves power, and also contributes to its simplicity and reliability of operation since the problem of the moving parts sticking as in a solenoid is eliminated.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An electromechanical actuator for maintaining an external device to which said actuator is connected, at an operating position when power is applied to the actuator and allowing said device to return to a default position when the power is removed, said actuator comprising:
   a housing;
   an output coupling rotatably mounted on said housing and configured to be connected to the device, said output coupling being adapted to displace the external device between the operating position and the default position;
   driving means, mounted in said housing, for providing a torque to said output coupling to displace said external device between the default position and the operating position when said driving means is energized;
   torque transmitting means for transmitting and changing said torque from said driving means to said output coupling, said torque transmitting means being cooperatively engaged to and located between said driving means and said output coupling;
   retracting means operatively connected to said torque transmitting means and configured for exerting a retracting force to return the device to the default position via said transmitting means when the power to said actuator is removed; and
   piezoelectric braking means for exerting a braking force on said driving means for maintaining said output coupling at said operating position against the retracting force exerted by the retracting means when said braking means is activated, and for releasing said braking force when said braking means is deactivated, wherein said piezoelectric braking means includes a stationary post and a beam structure having a first end fixedly attached to said post and a second end arranged and configured for exerting said braking force on said driving means when said braking means is activated.

2. The actuator as defined in claim 1 wherein said driving means is an electric motor having a flywheel rotatably attached thereto.

3. The actuator as defined in claim 2 wherein said braking force is applied to said flywheel.

4. The actuator as defined in claim 3 wherein said flywheel has formations on an edge thereof, said braking means being configured for latching onto said formations.

5. The actuator as defined in claim 4 wherein said formations are notches formed into said flywheel.

6. The actuator as defined in claim 1 wherein said torque transmitting means is a gear train for increasing said torque being applied to said output coupling from said driving means.

7. The actuator as defined in claim 1 further including switching means for deenergizing said driving means and activating said braking means when said switching means is activated.

8. The actuator as defined in claim 7 wherein said switching means is a microswitch.

9. The actuator as defined in claim 7 further including a torque plate pivotally attached to said driving means and configured for activating said switching means when said output coupling reaches said operating position.

10. The actuator as defined in claim 1 wherein said retracting means is a clock spring.

11. The actuator as defined in claim 1 wherein said beam structure includes at least one piezoelectric ceramic strip.

12. The actuator as defined in claim 1 wherein said braking means is activated by a control circuit, said control circuit applying a voltage to said beam structure for deflecting said second end towards said driving means.

13. The actuator as defined in claim 12 wherein said driving means includes a flywheel rotatably attached thereto and said second end has a pad attached thereto, said pad making a frictional contact with said flywheel when said braking means is activated.

14. The actuator as defined in claim 12 wherein said driving means includes a flywheel rotatably attached thereto, said flywheel having notches formed thereon, and wherein said second end matingly locks onto said notches when said braking means is activated.

15. An electromechanical actuator for maintaining an external device to which said actuator is connected, at an operating position when power is applied to the actuator and allowing said device to return to a default position when the power is removed, said actuator comprising:

a housing;

an output coupling rotatably mounted on said housing and configured to be connected to the device, said output coupling being adapted to displace the external device between the operating position and the default position;

a drive motor mounted in said housing for providing a torque to said output coupling to displace said external device between the default position and the operating position when said drive motor is energized;

torque transmitting means for transmitting and changing said torque from said drive motor to said output coupling, said torque transmitting means being cooperatively engaged to and located between said drive motor and said output coupling;

retracting means operatively connected to said torque transmitting means and configured for exerting a retracting force to return the device to the default position via said transmitting means when the power to said actuator is removed; and a piezoelectric braking means for operatively exerting a braking force on a rotatable shaft of said drive motor for maintaining said output coupling at said operating position against the retracting force exerted by the retracting means when said braking means is activated, and for releasing said braking force when said braking means is deactivated, wherein said piezoelectric braking means includes a stationary post and a beam structure having a first end fixedly attached to said post and a second end arranged and configured for exerting said braking force on said driving means when said braking means is activated.

* * * * *